Patented Mar. 17, 1942

2,276,710

UNITED STATES PATENT OFFICE 2,276,710

MANUFACTURE OF YEAST AND OTHER LIKE MICROORGANISMS

William Gordon Bennett, Epsom, England, assignor to Standard Brands Incorporated, New York, N. Y.

No Drawing. Application November 16, 1938, Serial No. 240,728. In Great Britain November 23, 1937

14 Claims. (Cl. 195—79)

The invention relates to a process for the manufacture of yeast and other ergosterol-containing microorganisms. More particularly, it pertains to a treatment of yeast and like microorganisms of a high ergosterol content, and includes correlated improvements and discoveries whereby the content of ergosterol may be further enhanced.

In U. S. P. 2,059,980, granted November 3, 1936, I have described a process for the manufacture of yeast and similar microorganisms whereby the ergosterol content is increased and which entails a cultivation of yeast in the presence of a non-toxic oxidizing agent in an aerated nutritive medium deficient in assimilable nitrogen.

It is an object of the present invention to provide an improvement upon the procedure described in the aforesaid patent whereby the increase in ergosterol content occasioned by the initial cultivation is still further increased by a supplementary treatment.

A further object of the invention is the provision of a process which will yield a yeast or other like microorganism having a relatively higher ergosterol content and which may be readily, economically and effectively produced on a commercial scale.

A still further object of the invention is to provide a procedure in connection with which a yeast is produced containing an amount of ergosterol which is several times the amount present in ordinary or normal yeast.

Another object of the invention is to provide a method in accordance with which yeast or other like microorganism is subjected to a supplemental aeration in the presence of a non-toxic oxidizing agent.

An additional object of the invention is the provision of a procedure wherein yeast is cultivated in a nutrient medium deficient in assimilable nitrogen.

A specific object of the invention is the manufacture of yeast in a medium containing a non-toxic oxidizing agent at a relatively high temperature for a period of hours and with addition of an organic nutrient devoid of nitrogen and phosphorus whereby the ergosterol content is markedly augmented.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

The procedure more especially relates to the manufacture of yeast for use as food for human beings and animals and for medicinal purposes. It is known that *S. cerevisiae* and other allied yeasts and microorganisms contain small amounts of ergosterol which is the parent substance of vitamin D and it has been suggested that the ergosterol content of yeast can be increased by incubating the yeast without growth in an aerated medium containing carbohydrates and phosphates.

According to the present process the ergosterol content of yeasts is increased by cultivating them initially under such conditions that during the whole or a part of the complete period of treatment they are subjected in the presence of an oxidizing agent or oxygen catalyst or carrier to deficiency in nitrogenous nutrient while the other nutrient substances are supplied in normal amount. The yeast thus produced is then further subjected while still suspended in the original liquor of the main or initial treatment, or after a removal therefrom and a re-suspension or redilution with water to a supplementary aeration in the presence of an innocuous oxidizing agent which may be that remaining with the yeast from the initial or main treatment, or that which is purposefully introduced thereafter, whereby the ergosterol content is still further increased.

It is preferable that the initial cultivation should be carried out at temperatures somewhat higher than those which are considered suitable for yeast propagation, for example, at temperatures ranging from 86–100° F. Further, the temperature which is maintained during the supplementary treatment is desirably somewhat higher than that of the main or initial treatment. Thus, if the initial cultivation is effected at a temperature of about 92° F., a suitable temperature for the supplementary treatment is in the neighborhood of 98° F., or generally about 6° F. higher.

The condition of nitrogenous deficiency may be brought about, for example, by adding the whole of the nitrogenous salts in the early stages of the fermentation, such total amount being, however, less than would normally be added for yeast growth. Alternatively, the yeast may be fed throughout the whole or part of the period of its growth with a nutritive medium in which the amount of nitrogen present is insufficient for the normal requirements of the yeast. The amount of nitrogen added is governed by the character and type of yeast which is being manufactured. Thus, the nitrogen additions may be up to 4.0% of the quantity of sugar in the propagating medium. A deficiency of nitrogen, accordingly, may be attained as above stated.

I have found that in spite of there being a deficiency of nitrogenous nutrient, the yield of yeast produced has remained unaltered and the yeast produced is considerably richer in ergosterol than a similar yeast grown under normal conditions of yeast propagation. As a further alternative, yeast that has been prepared under normal conditions can be taken and further treated under propagating conditions excepting that no further addition of assimilable nitrogen is made.

The propagation must take place under such conditions that a supply of oxygen is readily available to the yeast and therefore in addition to the aerating air, which serves both as oxidizer and agitator, I resort to the addition of a non-toxic oxidizing agent and otherwise designated as a non-toxic oxygen carrier or catalyst which may be, for example, a compound belonging to the group consisting of persulfates, percarbonates, peracetates, perphosphates, hydroquinone, indigo carmine, methylene blue; and peroxides as those of sodium, potassium and calcium. Further, the hydroquinone, indigo carmine and methylene blue are exemplifications of the organic compounds suitable for utilization and which are characterized by being in equilibrium with their hydrogenated derivatives, having an oxygen potential less than that of atmospheric oxygen or oxygen dissolved in an aqueous medium, and greater than that of yeast. The ergosterol content can also be further increased by exposing the yeast after growth to the action of air or oxygen. Moreover, it is preferred that the supplementary treatment should include not only aeration in the presence of a non-toxic oxidizing agent, as those above mentioned, but also the addition to the nutrient medium of an assimilable organic nutrient devoid of nitrogen and phosphorus. Particularly suitable nutrients are the lower aliphatic alcohols and the hydroxy acids, e. g. methyl alcohol, methylated spirits, ethyl alcohol, lactic acid, and mixtures thereof.

The process is applicable to the growth of *S. cerevisiae* or other microorganism capable of producing ergosterol for example, *Torula utilis* and *S. carlsbergensis*.

The following examples illustrate manners in which the invention may be carried into effect, and include details of the initial cultivation whereby the ergosterol content is increased and of the following or supplemental treatment in which the content of ergosterol is still further augmented.

*Example I*

To 400 grams of diluted molasses were added 20 per cent of seed yeast and propagation was started and continued for nine hours under normal conditions of dilution, aeration, acidity and addition of nutrient salts with the following exceptions:

(a) The temperature was higher than normal, namely, about 92° F.

(b) Two milligrams of methylene blue were added as oxygen carrier to assist the aeration, and (c) After taking into account the assimilable nitrogen already present in the molasses, standard nitrogen additions were made during only the first half of the total period of propagation so that during the second half period there was a marked deficiency of nitrogen.

When the total assimilable nitrogen used amounted to 2.4 grams (to the 400 grams of molasses) the eventual yield of yeast of high ergosterol content was 58%. In a repetition of the treatment but using 6.6 grams of nitrogen, the yield was 88%. The best results are obtained by the presence of about 1.5% total nitrogen calculated on the molasses taken, i. e., this amount including the assimilable nitrogen already present in the molasses as well as the added nitrogen. The yeast obtained had a content of 0.91% ergosterol calculated on the dry mass of the yeast.

The yeast initially cultivated in accordance with the foregoing procedure is then subjected to a supplemental aeration treatment in a nutrient medium which may be a fermented liquor from the initial cultivation and in which the aeration is maintained at the same rate as during the primary period. The temperature is maintained at about 98° F. and the pH value may be about 5.5. In the event that the pH value is greater or less than that just given, it may be properly adjusted by the addition of a suitable alkali or acid as may be required. The acid and alkali would be those which are innocuous to yeast and may include sulphuric acid, phosphoric acid, nitric acid, sodium, potassium, ammonium, calcium, carbonates, bicarbonates or hydroxides or other alkaline reacting salts as disodium hydrogen phosphate. At the start of the supplementary period 20% (calculated on weight of molasses originally used) of industrial methylated spirits is added to the mash and thereinto there is subsequently introduced at a fairly constant rate a solution containing 40% of industrial methylated spirits and 8% lactic acid in a suitable volume throughout a period of ten hours. At the conclusion thereof the yeast may be separated and pressed in the usual way. The yeast obtained has a content of 2.7% ergosterol calculated on the dry mass of the yeast.

*Example II*

391 grams of yeast as ordinarily manufactured and containing 0.4% ergosterol (calculated on the dry mass of yeast) were suspended in 4000 ccs. of water to which were added 100 grams of sucrose, 40 grams of potassium hydrogen phosphate ($KH_2PO_4$), 12 grams of magnesium sulfate ($MgSO_4\ 7H_2O$) and 10 of sodium persulfate ($Na_2S_2O_8$), the latter acting as an oxidizing catalyst. The mass was strongly aerated for six hours, the temperature meanwhile being maintained at 92° F. The yeast increased in weight to 457 grams and the ergosterol content had increased to 1.08 per cent. It is to be observed that in this case the added salts contained no nitrogen. Only the nitrogen already contained in the initial yeast was available, and this was sufficient to induce the further growth which therefore took place in circumstances of nitrogen deficiency as required in accordance with the invention.

The yeast so produced while retained in the fermented liquor of the foregoing initial cultivation may be subjected to a supplementary or further aeration at the original rate for a period of about 10 hours. The temperature of the fermenting medium should be about 98° F. and the pH value thereof about 5.5. Following the aeration period the yeast is separated and pressed in the usual way. Moreover an amount of non-toxic oxidizing agent or oxygen carrier may be added in amounts such as are hereinbefore specified.

It is to be observed that the duration of the supplementary treatment may be of the order of several hours, but if desired may be prolonged to a day or longer. Preferably, the period of treatment, and especially from the economical viewpoint, is about nine to ten hours. The temperature maintained during the further processing or treating should be advisably somewhat higher than that employed during the main or initial cultivation. Thus, if the initial cultivation is carried out at a temperature of 92° C., in accordance with which yeast is produced having a high ergosterol content, the supplemental treatment would be carried out at a temperature of about 98° F., whereby the content of ergosterol is still further increased.

Further, the total amount of nutrient utilized in the supplemental treatment may be introduced either at various stages or in a continuous manner. Preferably, a substantial portion of the total amount to be added is introduced at the beginning of the treatment and the remainder as a continuous feed. Furthermore, the concentration of the nutrient in the case of an alcohol, for example, methylated spirits, i. e., a mixture of methyl and ethyl alcohols, should not exceed 1% of the total amount of the liquid. When ethyl alcohol or methylated spirit, or a mixture of either with lactic acid is employed, the amount of nutrient is desirably of the order of 40 to 60% of the weight of the yeast or similar microorganism undergoing treatment. The procedure may also be carried out with aeration in stages, as in two stages rather than continuously, and when so carried out the nutrient may be added during the first stage only.

The foregoing procedure enables one to manufacture a yeast having enhanced values as a foodstuff for man and animal, and as a medicinal agent. This is particularly typified by an increased ergosterol content which amounts to several times that present in normal yeast. It will be realized that the invention in its broader aspects is not limited to the specific conditions as to quantities, times, temperatures and ingredients presented in the preceding examples. Thus, and more especially, potassium and lithium persulfates may be used in place of the sodium persulfate in Example II, also in place thereof utilization may be made of a percarbonate, a peracetate and a perphosphate, and a peroxide as of sodium, potassium, and calcium, in appropriate quantities. Also, it will be understood that the non-toxic oxidizing agents may be used per se or in compatible admixtures. Furthermore, in Example I, the methylene blue may be replaced by a suitable quantity of hydroquinone or indigo carmine, or like organic compounds.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent, is:

1. A process for the manufacture of yeast and like microorganisms having a high ergosterol content, which comprises cultivating yeast initially in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen and in the presence of a non-toxic oxidizing agent at a temperature which is up to 6° F. higher than that in the initial cultivation.

2. A process for the manufacture of yeast and like microorganisms having a high ergosterol content, which comprises cultivating yeast initially in the presence of a non-toxic oxidizing agent belonging to the group consisting of persulfates, peracetates, perphosphates, hydroquinone, indigo quinone, indigo carmine, methylene blue, and the peroxides of sodium, potassium and calcium in an aerated nutritive medium deficient in assimilable nitrogen whereby the ergosterol content is increased, and then further propagating yeast so produced by subjecting it to a further aeration in a nutrient medium deficient in assimilable nitrogen and in the presence of an aforesaid oxidizing agent at a temperature which is up to 6° F. higher than that in the initial cultivation.

3. A process for the manufacture of yeast and like microorganisms having a high ergosterol content, which comprises cultivating yeast initially in the presence of a non-toxic oxidizing agent in an aerated nutritive medium deficient in assimilable nitrogen at a temperature of about 86 to 100° F. whereby the ergosterol content is increased, and then further propagating yeast so produced by subjecting it to a further aeration in a nutrient medium deficient in assimilable nitrogen and in the presence of a non-toxic oxidizing agent at a temperature which is up to 6° F. higher than that utilized in the initial cultivation but less than 100° F.

4. A process for the manufacture of yeast and like microorganisms having a high ergosterol content, which comprises propagating yeast initially in a seeded mash by the usual aeration methods subject to the following variations: (a) a propagating temperature of about 92° F., (b) addition of a non-toxic oxidizing agent belonging to the group consisting of persulfates, percarbonates, peracetates, perphosphates, hydroquinone, indigo carmine, methylene blue, and the peroxides of sodium, potassium and calcium additional to the aerating air, and (c) a propagating medium containing nutrient salts but deficient in assimilable nitrogen, and then subjecting the yeast so produced to a further aeration with attending growth at a temperature of about 98° F. in the presence of an aforesaid non-toxic oxidizing agent and for a period sufficient to augment the ergosterol content.

5. A process for the manufacture of yeast and like microorganisms having a high ergosterol content, which comprises propagating yeast initially in a seeded mash by the usual aeration methods subject to the following variations: (a) a propagating temperature of about 86 to 100° F., (b) addition of a non-toxic oxidizing agent belonging to the group consisting of persulfates, percarbonates, peracetates, perphosphates, hydroquinone, indigo carmine, methylene blue, and the peroxides of sodium, potassium and calcium additional to the aerating air, and (c) a propagating medium containing nutrient salts but deficient in assimilable nitrogen, and then subjecting the yeast thus produced to a further aeration with attending growth at a temperature up to 6° F. higher than that employed in the initial propagation but less than 100° F. in the presence of an aforesaid non-toxic oxidizing agent and for a period sufficient to augment the ergosterol content.

6. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating the yeast by subjecting it to a further aeration in a nutrient medium deficient in assimilable nitrogen in the presence of a non-toxic oxidizing agent and at a temperature which is up to 6° F. higher than that in the initial cultivation for a period of time sufficient to augment the ergosterol content.

7. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating the yeast by subjecting it to a further aeration in a nutrient medium deficient in assimilable nitrogen in the presence of a non-toxic oxidizing agent and at a temperature which is up to 6° F. higher than that in the initial cultivation for a period of about eight to ten hours.

8. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen, having a pH value of about 5.5 and containing a non-toxic oxidizing agent for a period of about eight to ten hours, and at a temperature of about 98° F.

9. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen with addition of an organic nutrient devoid of nitrogen and phosphorus belonging to the lower aliphatic alcohols and in the presence of a non-toxic oxidizing agent.

10. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen with addition of an organic nutrient devoid of nitrogen and phosphorus belonging to the lower aliphatic alcohols in conjunction with lactic acid and in the presence of a non-toxic oxidizing agent.

11. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen with addition of an organic nutrient devoid of nitrogen and phosphorus belonging to the lower aliphatic alcohols in an amount up to 1% based upon the amount of liquid and in the presence of a non-toxic oxidizing agent.

12. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen with addition of an organic nutrient devoid of nitrogen and phosphorus belonging to the lower aliphatic alcohols in an amount of 40 to 60% based upon the weight of the yeast and in the presence of a non-toxic oxidizing agent.

13. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen with addition of an organic nutrient devoid of nitrogen and phosphorus belonging to the lower aliphatic alcohols in conjunction with lactic acid, in the presence of a non-toxic oxidizing agent at a temperature of about 98° F. and for a period sufficient to increase the ergosterol content.

14. A process for the manufacture of a yeast having a high ergosterol content, which comprises cultivating a yeast capable of producing ergosterol in the presence of a non-toxic oxidizing agent in an aerated nutritive medium deficient in assimilable nitrogen whereby the ergosterol content is increased, and then further propagating yeast so produced by subjecting it to a further aeration in a nutrient medium deficient in assimilable nitrogen with addition of an organic nutrient devoid of nitrogen and phosphorus belonging to the lower aliphatic alcohols in conjunction with lactic acid, in the presence of a non-toxic oxidizing agent at a temperature of about 98° F. and for a period of nine to ten hours.

WILLIAM GORDON BENNETT.

CERTIFICATE OF CORRECTION.

Patent No. 2,276,710.  March 17, 1942.

WILLIAM GORDON BENNETT.

It is hereby certified that error appears in the printed specification of the above numbered patent requiring correction as follows: Page 3, second column, line 12, claim 2, after "persulfates," insert --percarbonates,--; lines 13 and 14, same claim, strike out "indigo quinone,"; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.